United States Patent
Nazarpoor et al.

(10) Patent No.: US 9,861,964 B1
(45) Date of Patent: Jan. 9, 2018

(54) ENHANCED CATALYTIC ACTIVITY AT THE STOICHIOMETRIC CONDITION OF ZERO-PGM CATALYSTS FOR TWC APPLICATIONS

(71) Applicant: Clean Diesel Technologies, Inc., Oxnard, CA (US)

(72) Inventors: Zahra Nazarpoor, Camarillo, CA (US); Stephen J. Golden, Santa Barbara, CA (US)

(73) Assignee: Clean Diesel Technologies, Inc., Oxnard, CA (US)

( * ) Notice: Subject to any disclaimer, the term of this patent is extended or adjusted under 35 U.S.C. 154(b) by 0 days.

(21) Appl. No.: 15/377,368

(22) Filed: Dec. 13, 2016

(51) Int. Cl.
*B01J 21/00* (2006.01)
*B01J 21/04* (2006.01)
(Continued)

(52) U.S. Cl.
CPC ........ *B01J 23/8892* (2013.01); *B01D 53/945* (2013.01); *B01J 23/005* (2013.01);
(Continued)

(58) Field of Classification Search
CPC ........ B01J 21/005; B01J 21/04; B01J 21/063; B01J 21/066; B01J 21/08; B01J 23/005;
(Continued)

(56) References Cited

U.S. PATENT DOCUMENTS

| 4,629,472 A | 12/1986 | Haney, III et al. |
| 4,891,050 A | 1/1990 | Bowers et al. |

(Continued)

FOREIGN PATENT DOCUMENTS

| WO | WO 90/07561 | 7/1990 |
| WO | WO 94/11467 | 5/1994 |

(Continued)

OTHER PUBLICATIONS

Golden, S. et al., *Novel Mixed Metal Oxide Structure for Next Generation Three-Way Catalysts*, 2015-01-1007, SAE Technical Paper, (2015) 5 pages.

*Primary Examiner* — Cam N. Nguyen
(74) *Attorney, Agent, or Firm* — Alston & Bird LLP

(57) ABSTRACT

The present disclosure relates to zero-PGM (ZPGM) catalysts including variations of Nickel-doped Copper-Manganese spinel for improved catalyst performance at the stoichiometric condition for use within three-way catalyst (TWC) applications. The ZPGM catalyst material compositions within the aforementioned ZPGM catalysts are expressed with general formulas of $Cu_{1-x}Ni_xMn_2O_4$ (A-site substitution) and $Cu_1Mn_{2-x}Ni_xO_4$ (B-site substitution). The ZPGM catalysts are subjected to a TWC isothermal steady-state sweep test to assess the catalytic performance (e.g., NO conversion). Test results indicate the ZPGM catalysts exhibit higher NO conversions, at stoichiometric condition and lean conditions, when Ni substituted the B-site cation of the Cu—Mn spinel as compared to Ni substituted the A-site cation of the Cu—Mn spinel. Additionally, NO conversions of the ZPGM catalysts are significantly affected, at the stoichiometric condition, by the molar ratio of the Ni dopant within the A or B-site cation of the Cu—Mn spinel.

11 Claims, 5 Drawing Sheets

(51) Int. Cl.
*B01J 21/06* (2006.01)
*B01J 21/08* (2006.01)
*B01J 23/00* (2006.01)
*B01J 23/72* (2006.01)
*B01J 23/755* (2006.01)
*B01J 23/889* (2006.01)
*B01J 35/00* (2006.01)
*B01J 35/02* (2006.01)
*B01J 35/04* (2006.01)
*B01J 23/20* (2006.01)
*B01J 37/02* (2006.01)
*B01J 37/08* (2006.01)
*B01D 53/94* (2006.01)

(52) U.S. Cl.
CPC ........... *B01J 23/20* (2013.01); *B01J 35/0006* (2013.01); *B01J 35/02* (2013.01); *B01J 37/0213* (2013.01); *B01J 37/0242* (2013.01); *B01J 37/08* (2013.01); *B01D 2255/2073* (2013.01); *B01D 2255/2092* (2013.01); *B01D 2255/20715* (2013.01); *B01D 2255/20753* (2013.01); *B01D 2255/20761* (2013.01); *B01D 2255/9022* (2013.01)

(58) Field of Classification Search
CPC ...... B01J 23/72; B01J 23/755; B01J 23/8892; B01J 35/02; B01J 35/04; B01J 35/0006
See application file for complete search history.

(56) References Cited

U.S. PATENT DOCUMENTS

| | | | |
|---|---|---|---|
| 4,892,562 A | 1/1990 | Bowers et al. | |
| 5,034,020 A | 7/1991 | Epperly et al. | |
| 5,168,836 A | 12/1992 | Kraus | |
| 5,203,166 A | 4/1993 | Miller | |
| 5,266,083 A | 11/1993 | Peter-Hoblyn et al. | |
| 5,404,841 A | 4/1995 | Valentine | |
| 5,501,714 A | 3/1996 | Valentine et al. | |
| 5,535,708 A | 7/1996 | Valentine | |
| 5,584,894 A | 12/1996 | Peter-Hoblyn et al. | |
| 5,693,106 A | 12/1997 | Peter-Hoblyn et al. | |
| 5,732,548 A | 3/1998 | Peter-Hoblyn et al. | |
| 5,743,922 A | 4/1998 | Peter-Hoblyn et al. | |
| 5,749,928 A | 5/1998 | Epperly et al. | |
| 5,809,774 A | 9/1998 | Peter-Hoblyn et al. | |
| 5,809,775 A | 9/1998 | Tarabulski et al. | |
| 5,819,529 A | 10/1998 | Peter-Hoblyn | |
| 5,868,421 A | 2/1999 | Eyrainer | |
| 5,921,080 A | 7/1999 | Ulmet et al. | |
| 5,924,280 A | 7/1999 | Tarabulski | |
| 5,939,354 A | 8/1999 | Golden | |
| 5,968,464 A | 10/1999 | Peter-Hoblyn et al. | |
| 5,976,475 A | 11/1999 | Peter-Hoblyn et al. | |
| 5,977,017 A | 11/1999 | Golden | |
| 6,003,303 A | 12/1999 | Peter-Hoblyn et al. | |
| 6,023,928 A | 2/2000 | Peter-Hoblyn et al. | |
| 6,051,040 A | 4/2000 | Peter-Hoblyn et al. | |
| 6,063,350 A | 5/2000 | Tarabulski et al. | |
| 6,124,130 A | 9/2000 | Olson | |
| 6,153,161 A | 11/2000 | Fetzer et al. | |
| 6,203,770 B1 | 3/2001 | Peter-Hoblyn et al. | |
| 6,279,603 B1 | 8/2001 | Czarnik et al. | |
| 6,352,955 B1 | 3/2002 | Golden | |
| 6,361,754 B1 | 3/2002 | Peter-Hoblyn et al. | |
| 6,372,686 B1 | 4/2002 | Golden | |
| 6,531,425 B2 | 3/2003 | Golden | |
| 6,948,926 B2 | 9/2005 | Valentine et al. | |
| 7,014,825 B2 | 3/2006 | Golden | |
| 7,473,288 B2 | 1/2009 | Toyoda et al. | |
| 7,527,776 B2 | 5/2009 | Golden et al. | |
| 7,641,875 B1 | 1/2010 | Golden | |
| 8,323,601 B2 | 12/2012 | Justic et al. | |
| 8,496,896 B2 | 7/2013 | Golden et al. | |
| 8,685,352 B2* | 4/2014 | Golden | B01D 53/945 423/213.2 |
| 8,802,582 B2 | 8/2014 | Malyala et al. | |
| 8,845,987 B1 | 9/2014 | Nazarpoor et al. | |
| 8,853,121 B1 | 10/2014 | Nazarpoor et al. | |
| 8,858,903 B2 | 10/2014 | Nazarpoor | |
| 9,216,383 B2* | 12/2015 | Nazarpoor | B01D 53/945 |
| 9,216,408 B2 | 12/2015 | Nazarpoor | |
| 9,216,409 B2* | 12/2015 | Nazarpoor | B01J 23/8892 |
| 9,216,410 B2 | 12/2015 | Hatfield | |
| 9,227,177 B2* | 1/2016 | Nazarpoor | B01J 23/8892 |
| 9,427,730 B2* | 8/2016 | Nazarpoor | B01J 37/0244 |
| 9,433,930 B2* | 9/2016 | Nazarpoor | B01J 23/8892 |
| 9,511,355 B2* | 12/2016 | Nazarpoor | B01J 23/8986 |
| 9,511,358 B2* | 12/2016 | Nazarpoor | B01J 23/005 |
| 9,545,626 B2* | 1/2017 | Nazarpoor | B01D 53/944 |
| 9,610,570 B2* | 4/2017 | Nazarpoor | B01J 23/8892 |
| 2001/0001354 A1 | 5/2001 | Peter-Hoblyn et al. | |
| 2002/0001554 A1 | 1/2002 | Czarnik et al. | |
| 2002/0042341 A1 | 4/2002 | Golden | |
| 2003/0109047 A1 | 6/2003 | Valentine | |
| 2003/0126789 A1 | 7/2003 | Valentine et al. | |
| 2003/0148235 A1 | 8/2003 | Valentine et al. | |
| 2003/0185722 A1 | 10/2003 | Toyoda | |
| 2003/0198582 A1 | 10/2003 | Golden | |
| 2004/0098905 A1 | 5/2004 | Valentine et al. | |
| 2004/0172876 A1 | 9/2004 | Sprague et al. | |
| 2005/0132674 A1 | 6/2005 | Toyoda et al. | |
| 2005/0160663 A1 | 7/2005 | Valentine | |
| 2005/0160724 A1 | 7/2005 | Valentine et al. | |
| 2005/0164139 A1 | 7/2005 | Valentine et al. | |
| 2005/0188605 A1 | 9/2005 | Valentine et al. | |
| 2005/0217751 A1 | 10/2005 | Valentine et al. | |
| 2006/0081922 A1 | 4/2006 | Golden | |
| 2006/0120936 A1 | 6/2006 | Alive et al. | |
| 2006/0166816 A1 | 7/2006 | Zhang et al. | |
| 2006/0228283 A1 | 10/2006 | Malyala et al. | |
| 2006/0254535 A1 | 11/2006 | Valentine et al. | |
| 2006/0260185 A1 | 11/2006 | Valentine et al. | |
| 2007/0015656 A1 | 1/2007 | Valentine et al. | |
| 2007/0209272 A1 | 9/2007 | Valentine | |
| 2007/0283681 A1 | 12/2007 | Makkee et al. | |
| 2008/0210184 A1 | 9/2008 | Valentine et al. | |
| 2008/0226524 A1 | 9/2008 | Alive et al. | |
| 2009/0004083 A1 | 1/2009 | Valentine et al. | |
| 2009/0304566 A1 | 12/2009 | Golden et al. | |
| 2009/0324468 A1 | 12/2009 | Golden et al. | |
| 2009/0324469 A1 | 12/2009 | Golden et al. | |
| 2010/0240525 A1 | 9/2010 | Golden et al. | |
| 2010/0316545 A1 | 12/2010 | Alive et al. | |
| 2010/0316547 A1 | 12/2010 | Justice et al. | |
| 2011/0239626 A1 | 10/2011 | Makkee et al. | |
| 2012/0183447 A1 | 7/2012 | Kwan et al. | |
| 2013/0115144 A1 | 5/2013 | Golden et al. | |
| 2013/0236380 A1 | 9/2013 | Golden et al. | |
| 2014/0271384 A1 | 9/2014 | Nazarpoor et al. | |
| 2014/0271387 A1 | 9/2014 | Nazarpoor | |
| 2014/0271388 A1 | 9/2014 | Nazarpoor et al. | |
| 2014/0271390 A1 | 9/2014 | Nazarpoor | |
| 2014/0271391 A1 | 9/2014 | Nazarpoor | |
| 2014/0271392 A1 | 9/2014 | Nazarpoor | |
| 2014/0271393 A1 | 9/2014 | Nazarpoor | |
| 2014/0271425 A1 | 9/2014 | Nazarpoor | |
| 2014/0274662 A1 | 9/2014 | Nazarpoor | |
| 2014/0274663 A1 | 9/2014 | Nazarpoor | |
| 2014/0274674 A1 | 9/2014 | Nazarpoor et al. | |
| 2014/0274675 A1 | 9/2014 | Nazarpoor | |
| 2014/0274677 A1 | 9/2014 | Nazarpoor | |
| 2014/0274678 A1 | 9/2014 | Nazarpoor | |
| 2014/0298714 A1 | 10/2014 | Sprague | |
| 2014/0301906 A1 | 10/2014 | Hatfield | |
| 2014/0301909 A1 | 10/2014 | Nazarpoor | |
| 2014/0301926 A1 | 10/2014 | Hatfield | |
| 2014/0301931 A1 | 10/2014 | Nazarpoor | |
| 2014/0302983 A1 | 10/2014 | Nazarpoor | |
| 2014/0334978 A1 | 11/2014 | Hatfield | |
| 2014/0334989 A1 | 11/2014 | Nazarpoor et al. | |
| 2014/0334990 A1 | 11/2014 | Nazarpoor | |

(56) References Cited

U.S. PATENT DOCUMENTS

| | | |
|---|---|---|
| 2014/0335625 A1 | 11/2014 | Hatfield |
| 2014/0335626 A1 | 11/2014 | Hatfield |
| 2014/0336038 A1 | 11/2014 | Nazarpoor et al. |
| 2014/0336044 A1 | 11/2014 | Nazarpoor et al. |
| 2014/0336045 A1 | 11/2014 | Nazarpoor et al. |
| 2014/0356243 A1 | 12/2014 | Nazarpoor |
| 2014/0357475 A1 | 12/2014 | Nazarpoor et al. |
| 2014/0357479 A1 | 12/2014 | Nazarpoor et al. |
| 2014/0360164 A1 | 12/2014 | Sprague et al. |
| 2014/0364303 A1 | 12/2014 | Hatfield |
| 2015/0004709 A1 | 1/2015 | Nazarpoor |
| 2015/0005157 A1 | 1/2015 | Nazarpoor et al. |
| 2015/0005158 A1 | 1/2015 | Nazarpoor |
| 2015/0005159 A1 | 1/2015 | Nazarpoor et al. |
| 2015/0017082 A1 | 1/2015 | Nazarpoor |
| 2015/0018202 A1 | 1/2015 | Nazarpoor et al. |
| 2015/0018203 A1 | 1/2015 | Nazarpoor et al. |
| 2015/0018204 A1 | 1/2015 | Nazarpoor et al. |
| 2015/0018205 A1 | 1/2015 | Nazarpoor et al. |
| 2015/0031268 A1 | 1/2015 | Waites et al. |
| 2015/0050742 A1 | 2/2015 | Nazarpoor |
| 2015/0051067 A1 | 2/2015 | Nazarpoor et al. |
| 2015/0105242 A1 | 4/2015 | Nazarpoor et al. |
| 2015/0105243 A1 | 4/2015 | Nazarpoor et al. |
| 2015/0105245 A1 | 4/2015 | Nazarpoor et al. |
| 2015/0105246 A1 | 4/2015 | Nazarpoor et al. |
| 2015/0105247 A1 | 4/2015 | Nazarpoor et al. |
| 2015/0147239 A1 | 5/2015 | Launois et al. |
| 2015/0147251 A1 | 5/2015 | Nazarpoor et al. |
| 2015/0148215 A1 | 5/2015 | Nazarpoor |
| 2015/0148216 A1 | 5/2015 | Nazarpoor et al. |
| 2015/0148220 A1 | 5/2015 | Nazarpoor |
| 2015/0148222 A1 | 5/2015 | Nazarpoor |
| 2015/0148223 A1 | 5/2015 | Nazarpoor et al. |
| 2015/0148224 A1 | 5/2015 | Nazarpoor et al. |
| 2015/0148225 A1 | 5/2015 | Nazarpoor et al. |
| 2015/0182951 A1 | 7/2015 | Nazarpoor et al. |
| 2015/0182954 A1 | 7/2015 | Nazarpoor et al. |
| 2015/0196902 A1 | 7/2015 | Golden et al. |
| 2015/0238940 A1 | 8/2015 | Nazarpoor et al. |
| 2015/0238941 A1 | 8/2015 | Nazarpoor et al. |
| 2015/0258496 A1 | 9/2015 | Hatfield et al. |
| 2015/0290627 A1 | 10/2015 | Nazarpoor et al. |
| 2015/0290630 A1 | 10/2015 | Nazarpoor et al. |
| 2015/0316524 A1 | 11/2015 | Hatfield |
| 2015/0352494 A1 | 12/2015 | Hatfield et al. |
| 2015/0352529 A1 | 12/2015 | Nazarpoor et al. |
| 2015/0352531 A1 | 12/2015 | Hatfield et al. |
| 2015/0352532 A1 | 12/2015 | Hatfield et al. |
| 2015/0352533 A1 | 12/2015 | Hatfield et al. |
| 2016/0023188 A1 | 1/2016 | Nazarpoor et al. |
| 2016/0030885 A1 | 2/2016 | Hatfield |
| 2016/0047751 A1 | 2/2016 | Pless et al. |
| 2016/0082422 A1 | 3/2016 | Nazarpoor et al. |
| 2016/0121304 A1 | 5/2016 | Nazarpoor et al. |
| 2016/0121308 A1 | 5/2016 | Nazarpoor et al. |
| 2016/0121309 A1 | 5/2016 | Nazarpoor et al. |
| 2016/0136617 A1 | 5/2016 | Nazarpoor et al. |
| 2016/0136618 A1 | 5/2016 | Nazarpoor et al. |
| 2016/0136619 A1 | 5/2016 | Nazarpoor et al. |
| 2016/0136620 A1 | 5/2016 | Nazarpoor et al. |
| 2016/0136621 A1 | 5/2016 | Nazarpoor et al. |
| 2016/0167023 A1 | 6/2016 | Nazarpoor et al. |
| 2016/0167024 A1 | 6/2016 | Nazarpoor et al. |
| 2016/0263526 A1 | 9/2016 | Golden |
| 2016/0263561 A1 | 9/2016 | Nazarpoor et al. |
| 2016/0312730 A1 | 10/2016 | Launois et al. |
| 2016/0346765 A1 | 12/2016 | Nazarpoor et al. |
| 2016/0354765 A1 | 12/2016 | Hatfield et al. |
| 2016/0361710 A1 | 12/2016 | Nazarpoor et al. |
| 2016/0361711 A1 | 12/2016 | Nazarpoor et al. |

FOREIGN PATENT DOCUMENTS

| | | |
|---|---|---|
| WO | WO 95/02655 | 1/1995 |
| WO | WO 97/04045 | 2/1997 |
| WO | WO 97/09523 | 3/1997 |
| WO | WO 97/28358 | 8/1997 |
| WO | WO 97/36676 | 10/1997 |
| WO | WO 98/22209 A1 | 5/1998 |
| WO | WO 98/28070 A1 | 7/1998 |
| WO | WO 00/30739 A1 | 6/2000 |
| WO | WO 00/75643 A1 | 12/2000 |
| WO | WO 01/85876 A1 | 11/2001 |
| WO | WO 03/068363 A1 | 8/2003 |
| WO | WO 2004/058641 A1 | 7/2004 |
| WO | WO 2009/139860 A1 | 11/2009 |
| WO | WO 2011/068509 A1 | 6/2011 |
| WO | WO 2014/194101 A1 | 12/2014 |
| WO | WO 2015/199687 A1 | 12/2015 |
| WO | WO 2015/199688 A1 | 12/2015 |
| WO | WO 2016/039747 A1 | 3/2016 |
| WO | WO 2016/203371 | 12/2016 |

\* cited by examiner

US 9,861,964 B1

ENHANCED CATALYTIC ACTIVITY AT THE STOICHIOMETRIC CONDITION OF ZERO-PGM CATALYSTS FOR TWC APPLICATIONS

BACKGROUND

Field of the Disclosure

The present disclosure relates generally to catalyst materials, and more specifically, to zero-platinum group metals (ZPGM) catalysts including binary and ternary spinel compositions.

Background Information

Catalysts within catalytic converters have been used to decrease the pollution associated with exhaust from various sources, such as, for example automobiles, motorcycles, boats, generators, and other engine-equipped machines. Significant pollutants contained within the exhaust gas of gasoline engines include carbon monoxide (CO), unburned hydrocarbons (HC), and nitrogen oxides ($NO_x$), amongst others.

Conventional gasoline exhaust systems employ three-way catalysts (TWC) technology and are referred to as TWC systems. TWC systems convert the toxic CO, HC, and $NO_x$ into less harmful pollutants. Typically, TWC systems include a substrate structure upon which a layer of supporting and sometimes promoting oxides are deposited. Catalysts, based on platinum group metals (PGM), are then deposited upon the supporting oxides. Conventional PGM materials include platinum (Pt), palladium (Pd), rhodium (Rh), iridium (Ir), or combinations thereof.

Although PGM materials are effective for toxic emission control, PGM materials are scarce and expensive. The high cost remains a critical factor for widespread applications of PGM materials. As changes in the formulation of catalysts continue to increase the cost of TWC systems, the need for new low cost catalysts having improved catalytic performance has directed efforts toward the development of new catalytic materials capable of providing the required synergies to achieve greater catalytic performance. Additionally, compliance with ever stricter environmental regulations and the need for lower manufacturing costs require new types of TWC systems. Therefore, there is a continuing need to provide TWC systems free of PGM materials that exhibit catalytic properties substantially similar to or exceeding the catalytic properties exhibited by conventional TWC systems employing PGM materials.

SUMMARY

The present disclosure describes zero-platinum group metals (ZPGM) catalysts including nickel (Ni)-doped $Cu_xMn_{3-x}O_4$ spinel oxides. Further, the present disclosure describes a process for identifying suitable Ni molar ratios employed as A or B-site cation dopants that are capable of providing improved chemical reactivity at the stoichiometric condition within a binary Cu—Mn spinel composition to produce the aforementioned ZPGM catalysts. Examples of a partial substitution within the B-site cation of a Cu—Mn spinel are described in International Patent Application Ser. No. PCT/IB2016/053506, filed Jun. 14, 2016, the contents of which is hereby incorporated by reference in its entirety.

In some embodiments, the ZPGM catalysts include a substrate, a washcoat (WC) layer comprising a support oxide that is deposited onto the substrate, and an impregnation (IMP) layer comprising a spinel oxide that is impregnated onto the WC layer. In these embodiments, the aforementioned ZPGM catalysts are produced using any conventional synthesis methodology.

In some embodiments, a Cu—Mn spinel composition is implemented as a binary spinel composition within the IMP layer. In these embodiments, the Cu—Mn spinel composition is produced using a general formula $Cu_xMn_{3-x}O_4$ in which X is a variable representing different molar ratios from about 0.1 to about 1.5.

In some embodiments, the IMP layer includes a ternary spinel composition of Cu, Ni, and Mn, where Ni partially substitutes either the A-site cation of the Cu—Mn spinel. In an example, the A-site cation substitution of the Cu—Mn spinel employs a general formula $Cu_{1-x}Ni_xMn_2O_4$. In another example, the B-site cation substitution of the Cu—Mn spinel employs a general formula $Cu_1Mn_{2-x}Ni_xO_4$.

In some embodiments, ZPGM catalysts including binary and ternary spinel oxides of Cu, Mn, and Ni are analyzed to determine catalytic performance at the stoichiometric condition. In these embodiments, TWC isothermal steady-state sweep tests are conducted to measure the NO conversions by employing a flow reactor at an inlet temperature of about 500° C., at an R-value range from about 0.62 (lean condition) to about 2.28 (rich condition), and a space velocity (SV) of about 50,000 $hr^{-1}$ using a TWC gas condition.

In some embodiments, the test results confirm that significant NO conversion improvements are achieved when the Ni is partially substituted within B-site cation of the Cu—Mn spinel of the aforementioned ZPGM catalysts. In these embodiments, the test results indicate the factor that mostly influences the improvements in catalytic performance at the stoichiometric condition, within the aforementioned ZPGM catalysts, is the molar ratio of the Ni dopant. Further to these embodiments, the aforementioned ZPGM catalysts including spinel oxide of Cu, Mn, and Ni can provide significantly improved ZPGM catalysts for TWC applications.

In one aspect, embodiments of the invention are directed to a catalyst comprising: a substrate; a washcoat overlying the substrate, an impregnation layer overlying the washcoat, wherein the impregnation layer comprises a doped binary spinel having at least one of the formula $CuMn_{2-x}A_xO_4$ or $Cu_{1-x}A_xMn_2O_4$, wherein A is a dopant metal element.

In a preferred embodiment, the doped binary spinel is $CuMn_{2-x}Ni_xO_4$ or $Cu_{2-x}MnNi_xO_4$.

In some embodiments, x is a number from 0.01 to 1.99. In one embodiment, x is a number greater than any one or more of 0.01, 0.05, 0.1, 0.15, 0.20, 0.25, 0.30, 0.35, 0.45, 0.50, 0.55, 0.60, 0.65, 0.70, 075, 0.80, 0.85, 0.90, 0.95, 1.00, 1.05, 1.10, 1.15, 1.20, 1.25, 1.30, 1.35, 1.40, 1.45, 1.5, 1.55, 1.6, 1.65, 1.70, 1.75, 1.80, 1.85, 1.90, and 1.95. In some embodiments, x is a number that is less than any one or more of 1.99, 1.95, 1.90, 1.85, 1.80, 1.75, 1.70, 1.65, 1.60, 1.55, 1.50, 1.45, 1.40, 1.35, 1.30, 1.25, 1.20, 1.15, 1.10, 1.05, 1.00, 0.95, 0.90, 0.85, 0.80, 0.75, 0.70, 0.65, 0.60, 0.55, 0.50, 0.45, 0.40, 0.35, 0.30, 0.25, 0.20, 0.15, 0.10, 0.05, 0.025.

In one embodiment according to anyone of the preceding two paragraphs, x is a number ranging from 0.05 to 1.9. For example, y may be a number ranging from 0.1 to 1.9; a number ranging from 0.2 to 1.9; a number ranging from 0.3 to 1.9; a number ranging from 0.4 to 1.9; a number ranging from 0.5 to 1.9; a number ranging from 0.6 to 1.9; a number ranging from 0.7 to 1.9; a number ranging from 0.8 to 1.9; a number ranging from 0.9 to 1.9; a number ranging from 1.0 to 1.9; a number ranging from 1.1 to 1.9; a number ranging from 1.2 to 1.9; a number ranging from 1.3 to 1.9; a number ranging from 1.4 to 1.9; or a number ranging from 1.5 to 1.9.

In a preferred embodiment, x is a number less than 2.0 and greater than 1.0, such as a number ranging from 1.4 to 1.8. In a preferred embodiment, the doped binary spinel has the formula of $CuMn_{2-x}Ni_xO_4$, wherein x is a number from 0.01 to 1.99. For example, x may be a number ranging from 0.2 to 1.8, from 0.2 to 1.5, from 0.2 to 1.25, from 0.2 to 1.0, from 0.2 to 0.75, from 0.2 to 0.5, from 0.5 to 1.8, from 0.5 to 1.5, ranging from 0.5 to 1.25, from 0.5 to 1.0, from 0.5 to 0.75, from 0.75 to 1.8, from 0.75 to 1.5, from 0.75 to 1.25, from 0.75 to 1.0, from 1.0 to 1.8, from 1.0 to 1.5, or from 1.0 to 1.25.

In other embodiments, the doped binary spinel has the formula of $Cu_{1-x}Ni_xMn_2O_4$, wherein x is a number from 0.01 to 0.99. For example, x may be a number ranging from 0.01 to 0.70, from 0.01 to 0.5, from 0.01 to 0.2, from 0.01 to 0.1, from 0.1 to 0.7, from 0.1 to 0.5, from 0.1 to 0.2, from 0.2 to 0.7, or from 0.2 to 0.5.

In some embodiments, the dopant metal element (A) is selected from the group consisting of nickel, titanium, aluminum, magnesium, cobalt, barium, lanthanum, cadmium, tin, yttrium, zirconium, silver, iron, chromium, niobium, cerium, scandium, molybdenum, tungsten, and combinations thereof.

In one embodiment, the washcoat layer comprises a support oxide on which the ternary spinel is deposited. In some embodiments, the support oxide is selected from the group consisting of $Al_2O_3$, doped $Al_2O_3$, $ZrO_2$, doped $ZrO_2$, $SiO_2$, doped $SiO_2$, $TiO_2$, doped $TiO_2$, $Al_2O_3$—$ZrO_2$, doped $Al_2O_3$—$ZrO_2$, $Nb_2O_5$, doped $Nb_2O_5$, and mixtures thereof.

In one embodiment, the dopant in the support oxide is selected from the group consisting of calcium, strontium, barium, yttrium, lanthanum, cerium, neodymium, praseodymium, niobium, silicon, tantalum, and combinations thereof. In a preferred embodiment, the washcoat layer comprises Nb-doped $Al_2O_3$—$ZrO_2$.

In one embodiment, the impregnation layer is deposited onto the substrate as a solution, and has been calcined at a temperature from about 600° C. to about 700° C.

A further aspect of the invention is directed to a catalyst comprising a substrate; a washcoat layer overlying the substrate, wherein the washcoat layer comprises a support oxide; and an impregnation layer overlying the washcoat layer, and wherein the impregnation layer comprises a doped binary spinel having the formula $CuMn_{2-x}Ni_xO_4$ wherein x is a number from 0.01 to 1.99.

In one embodiment, the doped binary spinel has the formula $CuMn_{2-x}Ni_xO_4$ wherein x is a number ranging from 0.2 to 1.8, such as for example, a number ranging from 0.2 to 1.5, a number ranging from 0.2 to 1.25, a number ranging from 0.2 to 1.0, a number ranging from 0.2 to 0.75, a number ranging from 0.2 to 0.5, a number ranging from 0.5 to 1.8, a number ranging from 0.5 to 1.50, a number ranging from 0.5 to 1.25, a number ranging from 0.5 to 1.0, a number ranging from 0.5 to 0.75, a number ranging from 0.75 to 1.8, a number ranging from 0.75 to 1.5, a number ranging from 0.75 to 1.25, a number ranging from 0.75 to 1.0, a number ranging from 1.0 to 1.8, a number ranging from 1.0 to 1.5, or a number ranging from 1.0 to 1.25.

In one embodiment, the doped binary spinel has the formula $CuMn_{2-x}A_xO_4$, and A is a dopant metal selected from the group consisting of titanium, aluminum, magnesium, cobalt, barium, lanthanum, cadmium, tin, yttrium, zirconium, silver, iron, chromium, niobium, cerium, scandium, molybdenum, tungsten, and combinations thereof.

In one embodiment, the doped binary spinel has the formula $CuMn_{2-x}Ni_xO_4$, and the support oxide is selected from the group consisting of $Al_2O_3$, doped $Al_2O_3$, $ZrO_2$, doped $ZrO_2$, $SiO_2$, doped $SiO_2$, $TiO_2$, doped $TiO_2$, $Al_2O_3$—$ZrO_2$, doped $Al_2O_3$—$ZrO_2$, $Nb_2O_5$, doped $Nb_2O_5$, and mixtures thereof. Examples of dopant in the support oxide include calcium, strontium, barium, yttrium, lanthanum, cerium, neodymium, praseodymium, niobium, silicon, tantalum, and combinations thereof. In a preferred embodiment, the washcoat layer comprises Nb-doped $Al_2O_3$—$ZrO_2$.

Additional aspects of the invention are directed to a catalyst comprising a substrate; a washcoat layer overlying the substrate, the washcoat layer comprising a support oxide, and an impregnation layer overlying the washcoat layer, wherein the impregnation layer comprises a doped spinel having the formula $Cu_{2-x}MnNi_xO_4$ wherein x is a number from 0.01 to 0.99.

In one embodiment, the doped binary spinel has the formula $Cu_{2-x}MnNi_xO_4$ wherein x is a number ranging from 0.01 to 0.70, such as, for example, a number ranging from 0.01 to 0.5, a number ranging from 0.01 to 0.2, a number ranging from 0.01 to 0.1, a number ranging from 0.1 to 0.7, a number ranging from 0.1 to 0.5, a number ranging from 0.1 to 0.2, a number ranging from 0.2 to 0.7, or a number ranging from 0.2 to 0.5.

In one embodiment, the doped binary spinel has the formula $Cu_{2-x}MnNi_xO_4$, and further comprises an additional dopant selected from the group consisting of titanium, aluminum, magnesium, cobalt, barium, lanthanum, cadmium, tin, yttrium, zirconium, silver, iron, chromium, niobium, cerium, scandium, molybdenum, tungsten, and combinations thereof.

In one embodiment, the doped binary spinel has the formula $Cu_{2-x}MnNi_xO_4$, and the support oxide is selected from the group consisting of $Al_2O_3$, doped $Al_2O_3$, $ZrO_2$, doped $ZrO_2$, $SiO_2$, doped $SiO_2$, $TiO_2$, doped $TiO_2$, $Al_2O_3$—$ZrO_2$, doped $Al_2O_3$—$ZrO_2$, $Nb_2O_5$, doped $Nb_2O_5$, and mixtures thereof. In some embodiments, the dopant in the support oxide is selected from the group consisting of calcium, strontium, barium, yttrium, lanthanum, cerium, neodymium, praseodymium, niobium, silicon, tantalum, and combinations thereof. In a preferred embodiment, the washcoat layer comprises Nb-doped $Al_2O_3$—$ZrO_2$.

In some embodiments, the catalyst exhibits an NO percent conversion that is from about 25 to about 70%.

Preferably, the catalyst is substantially free of platinum group metals.

Additional aspects of the invention are directed to a method of preparing a catalyst, comprising the steps of:

depositing a solution of a support oxide on a substrate;

calcining the solution of the support oxide to form a washcoat layer;

depositing a solution comprising copper, manganese and nickel overlying the washcoat layer, and calcining the deposited solution of the copper, manganese, and nickel to form an impregnation layer comprising a doped binary spinel having at least one of the formula In one aspect, embodiments of the invention are directed to a catalyst comprising: a substrate; a washcoat overlying the substrate, an impregnation layer overlying the washcoat, wherein the impregnation layer comprises a doped binary spinel having at least one of the formula $CuMn_{2-x}A_xO_4$ or $Cu_{1-x}A_xMn_2O_4$, wherein A is a dopant metal element. In some embodiments, x is a number from 0.01 to 1.99

In a preferred embodiment, the doped binary spinel is $CuMn_{2-x}Ni_xO_4$ or $Cu_{2-x}MnNi_xO_4$.

In some embodiments of the method, the impregnation layer is calcined at a temperature from about 600 to 700° C.

In some embodiments of the method, the doped binary spinel further comprises an additional dopant selected from the group consisting of titanium, aluminum, magnesium, cobalt, barium, lanthanum, cadmium, tin, yttrium, zirconium, silver, iron, chromium, niobium, cerium, scandium, molybdenum, tungsten, and combinations thereof.

In one embodiment of the inventive method, the support oxide is selected from the group consisting of $Al_2O_3$, doped $Al_2O_3$, $ZrO_2$, doped $ZrO_2$, $SiO_2$, doped $SiO_2$, $TiO_2$, doped $TiO_2$, $Al_2O_3$—$ZrO_2$, doped $Al_2O_3$—$ZrO_2$, $Nb_2O_5$, doped $Nb_2O_5$, and mixtures thereof. The dopant in the support oxide may be selected from the group consisting of calcium, strontium, barium, yttrium, lanthanum, cerium, neodymium, praseodymium, niobium, silicon, tantalum, and combinations thereof. In a preferred embodiment, the washcoat layer comprises Nb-doped $Al_2O_3$—$ZrO_2$.

Numerous other aspects, features, and benefits of the present disclosure may be made apparent from the following detailed description taken together with the drawing figures.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
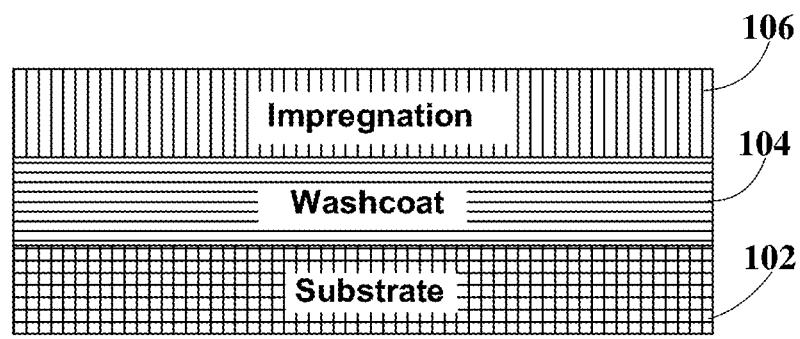
FIG. 1 is a functional block diagram illustrating a catalyst configuration for zero-platinum group metals (ZPGM) catalysts, according to an embodiment.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Definitions

As used here, the following terms have the following definitions:

"Calcination" refers to a thermal treatment process applied to solid materials, in presence of air, to bring about a thermal decomposition, phase transition, or removal of a volatile fraction at temperatures below the melting point of the solid materials.

"Conversion" refers to the chemical alteration of at least one material into one or more other materials.

"Impregnation" refers to the process of imbuing or saturating a solid layer with a liquid compound or the diffusion of some element through a medium or substance.

"Platinum group metals (PGM)" refers to platinum, palladium, ruthenium, iridium, osmium, and rhodium.

"R-value" refers to the value obtained by dividing the reductant components to oxidant components within a gas flow. R-value greater than about 1.0 refers to rich conditions. R-value less than about 1.0 refers to lean conditions. R-value equal to about 1.0 refers to stoichiometric condition.

"Spinel" refers to any minerals of the general formulation $AB_2O_4$ where the A ion and B ion are each selected from mineral oxides, such as, for example magnesium, iron, zinc, manganese, aluminum, chromium, titanium, nickel, cobalt, or copper, amongst others.

"Stoichiometric condition" refers to the condition when the oxygen of the combustion gas or air added equals the amount for completely combusting the fuel, an exhaust gas condition with an R-value equal to about 1.0.

"Substrate" refers to any material of any shape or configuration that yields a sufficient surface area for depositing a washcoat layer and/or an overcoat layer.

"Support oxide" refers to porous solid oxides, typically mixed metal oxides, which are used to provide a high surface area that aids in oxygen distribution, and exposure of catalysts to reactants, such as, for example $NO_X$, CO, and hydrocarbons.

"Three-Way Catalyst (TWC)" refers to a catalyst that performs the three simultaneous tasks of reduction of nitrogen oxides, oxidation of carbon monoxide, and oxidation of unburnt hydrocarbons.

"Washcoat (WC) layer" refers to at least one coating including at least one oxide solid that is deposited on a substrate.

"Zero-platinum group metals (ZPGM) catalyst" refers to a catalyst completely free of platinum group metals (PGM).

Description of the Disclosure

The present disclosure is directed to zero-platinum group metals (ZPGM) catalysts, which are produced according to a catalyst configuration including a substrate, a washcoat (WC) layer, and an impregnation (IMP) layer. Further, the present disclosure describes a process for identifying suitable nickel (Ni) molar ratios employed as A or B-site cation dopants that are capable of providing improved chemical reactivity at the stoichiometric condition within a binary spinel composition to produce the aforementioned ZPGM catalysts. In some embodiments, variations in the Ni molar ratios exhibit significant effects on NO conversion activity of the ZPGM catalysts, and can be used to produce a plurality of improved catalysts for three-way catalyst (TWC) applications.

ZPGM Catalyst Configuration, Material Composition, and Preparation

FIG. 1 is a functional block diagram illustrating a catalyst configuration for zero-platinum group metals (ZPGM) catalysts, according to an embodiment. In FIG. 1, catalyst configuration 100 includes substrate 102, washcoat (WC) layer 104, and impregnation (IMP) layer 106. In some embodiments, WC layer 104 is coated onto substrate 102. In these embodiments, IMP layer 106 is impregnated onto WC layer 104. Further to these embodiments, the aforementioned layers within ZPGM catalysts are produced using any conventional synthesis methodologies. In an example, WC layer 104 is implemented as a support oxide. In this example, IMP layer 106 is implemented as a spinel composition.

In some embodiments, WC layer 104 comprises support oxides. Examples of support oxides for use as WC layer 104 include alumina ($Al_2O_3$), doped $Al_2O_3$, zirconia ($ZrO_2$), doped $ZrO_2$, doped $Al_2O_3$—$ZrO_2$, $CeO_2$, $TiO_2$, $Nb_2O_5$, $SiO_2$, or mixtures thereof, amongst others. Further, doping materials within doped support oxides include Ca, Sr, Ba, Y, La, Ce, Nd, Pr, Nb, or Ta oxides, amongst others. In an example, WC layer 104 is implemented as an Nb-doped $Al_2O_3$—$ZrO_2$ support oxide.

In some embodiments, IMP layer 106 includes a plurality of ternary spinel compositions. In these embodiments, the IMP layer 106 includes copper (Cu) and manganese (Mn) doped with a third element (e.g., dopant element) within the spinel oxide structure. Examples of dopant elements suitable for Cu—Mn spinel structures include aluminum (Al), magnesium (Mg), nickel (Ni), silver (Ag), cobalt (Co), iron (Fe), chromium (Cr), titanium (Ti), tin (Sn), niobium (Nb), cerium (Ce), scandium (Sc), molybdenum (Mo), tungsten (W), or mixtures thereof, amongst others.

In an example, IMP layer 106 includes a Ni-doped Cu—Mn spinel composition, where Ni partially substitutes the A-site cation of the Cu—Mn spinel structure. In these embodiments, the Ni-doped Cu—Mn spinel composition is produced using a general formula of $Cu_{1-x}Ni_xMn_2O_4$ in which X is a variable representing different molar ratios within a range from about 0.01 to about 1.0.

In another example, IMP layer 106 includes a Ni-doped Cu—Mn spinel composition, where Ni partially substitutes the B-site cation of the Cu—Mn spinel structure. In these embodiments, the Ni-doped Cu—Mn spinel is produced using a general formula of $Cu_1Mn_{2-x}Ni_xO_4$ in which X is a variable representing different molar ratios within a range from about 0.01 to about 2.0.

In a further example, IMP layer 106 includes a Cu—Mn spinel composition as reference catalytic material. In this example, the Cu—Mn spinel composition is produced using a general formula $Cu_xMn_{3-x}O_4$ in which X is a variable representing molar ratios within a range from about 0.01 to about 2.99. Further to this example, X takes a value of 1.0 to produce a $Cu_1Mn_2O_4$ binary spinel composition.

ZPGM Type 1 Catalysts: B-site Ni-doped Cu—Mn Spinel Composition

In some embodiments, a ZPGM catalyst, referred to as ZPGM Type 1 catalyst, includes WC layer 104 comprising an Nb-doped $Al_2O_3$—$ZrO_2$ support oxide that is deposited onto suitable 102. In these embodiments, IMP layer 106 comprises a $Cu_1Mn_{2-x}Ni_xO_4$ spinel composition (B-site substitution) that is impregnated onto WC layer 104.

In some embodiments, the preparation of WC layer 104 begins by milling the Nb-doped $Al_2O_3$—$ZrO_2$ support oxide with water to produce an aqueous slurry of Nb-doped $Al_2O_3$—$ZrO_2$. In these embodiments, the slurry of Nb-doped $Al_2O_3$—$ZrO_2$ is coated onto substrate 102, and further dried and calcined at about 550° C. for about 4 hours to produce WC layer 104.

In some embodiments, the preparation of IMP layer 106 begins with mixing appropriate amounts of Mn nitrate solution, Ni nitrate solution, and Cu nitrate solution with water to produce a Cu—Mn—Ni solution at an appropriate molar ratio to produce a catalyst composition expressed with a formula of $Cu_1Mn_{2-x}Ni_xO_4$. In these embodiments, Ni partially substitutes the B-site cation of the Cu—Mn spinel in a plurality of molar ratios (e.g., 0.0, 0.2, 0.5, 0.75, 1.0, 1.25, 1.5, 1.75, and 2.0). Further to these embodiments, the Cu—Mn—Ni solution is then impregnated onto WC layer 104. In these embodiments, the impregnated Cu—Mn—Ni material is calcined at a temperature of about 600° C. to 700° C. for about 6 hours to produce IMP layer 106 comprising the $Cu_1Mn_{2-x}Ni_xO_4$ spinel composition (B-site substitution).

Table 1.

ZPGM Type 1 catalysts including IMP layers 106 comprising $Cu_1Mn_{2-x}Ni_xO_4$ spinel compositions.

| Catalyst | Ni loading | Spinel composition |
|---|---|---|
| Type 1A | 0.20 | $Cu_1Mn_{1.8}Ni_{0.2}O_4$ |
| Type 1B | 0.50 | $Cu_1Mn_{1.5}Ni_{0.5}O_4$ |
| Type 1C | 0.75 | $Cu_1Mn_{1.25}Ni_{0.75}O_4$ |
| Type 1D | 1.00 | $Cu_1Mn_1Ni_1O_4$ |
| Type 1E | 1.25 | $Cu_1Mn_{0.75}Ni_{1.25}O_4$ |
| Type 1F | 1.50 | $Cu_1Mn_{0.5}Ni_{1.5}O_4$ |
| Type 1G | 1.75 | $Cu_1Mn_{0.25}Ni_{1.75}O_4$ |
| Type 1H | 2.00 | $Cu_1Ni_2O_4$ |

ZPGM Type 2 Catalysts: A-Site Ni-Doped Cu—Mn Spinel Composition

In some embodiments, a ZPGM catalyst, referred to as ZPGM Type 2 catalyst, includes WC layer 104 comprising an Nb-doped $Al_2O_3$—$ZrO_2$ support oxide that is deposited onto substrate 102. In these embodiments, IMP layer 106 comprises a $Cu_{1-x}Ni_xMn_2O_4$ spinel composition (A-site substitution) that is impregnated onto WC layer 104.

In some embodiments, the preparation of WC layer 104 begins by milling the Nb-doped $Al_2O_3$—$ZrO_2$ with water to produce aqueous slurry of Nb-doped $Al_2O_3$—$ZrO_2$. In these embodiments, the slurry of Nb-doped $Al_2O_3$—$ZrO_2$ is coated onto substrate 102, and further dried and calcined at about 550° C. for about 4 hours to produce WC layer 104.

In some embodiments, the preparation of IMP layer 106 begins with mixing appropriate amounts of Mn nitrate solution, Ni nitrate solution, and Cu nitrate solution with water to produce a Cu—Mn—Ni solution at an appropriate molar ratio to produce a catalyst composition expressed with a formula of $Cu_{1-x}Ni_xMn_2O_4$. In these embodiments, Ni partially substitutes the A-site cation of the Cu—Mn spinel in a plurality of molar ratios (e.g., 0.01, 0.02, 0.1, 0.2, 0.5, 0.7, and 1.0). Further to these embodiments, the Cu—Mn—Ni solution is then impregnated onto WC layer 104. In these embodiments, the Cu—Mn—Ni material is calcined at a temperature of about 600° C. to 700° C. for about 6 hours to produce IMP layer 106 comprising the $Cu_{1-x}Ni_xMn_2O_4$ spinel composition (A-site substitution).

Table 2.

ZPGM Type 2 catalysts including IMP layers 106 comprising $Cu_{1-x}Ni_xMn_2O_4$ spinel compositions.

| Catalyst | Ni loading | Spinel composition |
|---|---|---|
| Type 2A | 0.01 | $Cu_{0.99}Ni_{0.01}Mn_2O_4$ |
| Type 2B | 0.02 | $Cu_{0.98}Ni_{0.02}Mn_2O_4$ |
| Type 2C | 0.10 | $Cu_{0.9}Ni_{0.1}Mn_2O_4$ |
| Type 2D | 0.20 | $Cu_{0.8}Ni_{0.2}Mn_2O_4$ |
| Type 2E | 0.50 | $Cu_{0.5}Ni_{0.5}Mn_2O_4$ |
| Type 2F | 0.70 | $Cu_{0.3}Ni_{0.7}Mn_2O_4$ |

ZPGM Reference Catalyst

In some embodiments, a ZPGM reference catalyst includes WC layer 104 comprising an Nb-doped $Al_2O_3$—$ZrO_2$ support oxide that is deposited onto substrate 102. In these embodiments, IMP layer 106 comprises a $Cu_1Mn_2O_4$ binary spinel composition that is impregnated onto WC layer 104.

TWC Isothermal Steady-State Sweep Test Procedure

In some embodiments, a TWC isothermal steady-state sweep test is performed employing a flow reactor at an inlet temperature of about 500° C. and using a gas stream having 11-point R-values from about 0.62 (lean condition) to about 2.28 (rich condition) to measure the CO, NO, and HC conversions. In these embodiments, the space velocity (SV) employed within the TWC isothermal steady-state sweep test is set at about 50,000 $hr^{-1}$. Further to these embodiments, the gas feed employed for the test is a standard TWC gas composition with variable $O_2$ concentration to adjust R-values from lean conditions to rich conditions during testing. In these embodiments, the standard TWC gas composition includes about 8,000 ppm of CO, about 400 ppm of $C_3H_6$, about 100 ppm of $C_3H_8$, about 1,000 ppm of $NO_X$, about 2,000 ppm of $H_2$, about 10% of $CO_2$, and about 10% of $H_2O$. Further to these embodiments, the quantity of $O_2$ within the gas mix is varied to regulate the $O_2$ percentage within feed gas from about 0.2% to about 0.8%. In these embodiments, the stoichiometric condition is at an $O_2$ percentage of about 0.49% (at an R-value of about 1.0).

In some embodiments, the TWC isothermal steady-state sweep test is applied to ZPGM Type 1 catalysts and Type 2 catalysts to determine the NO conversion levels, after aging employing a multi-mode condition test at about 800° C. for about 10 hours.

Catalytic Performance Analysis of the Aforementioned ZPGM Catalysts

Figure 2:
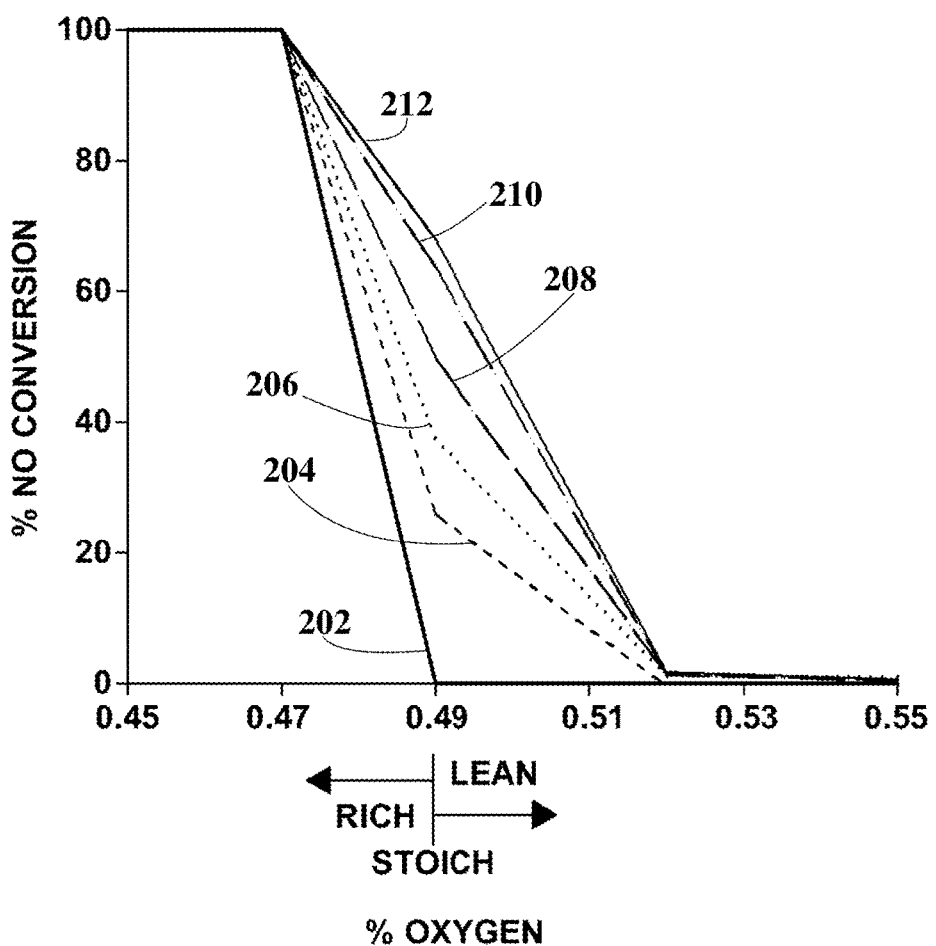
FIG. 2 is a graphical representation illustrating three-way catalyst (TWC) steady-state sweep test results comparing % NO conversions at specific % $O_2$ values associated with aged ZPGM Type 1 catalysts employing various doping loadings of Ni within a B-site substitution of Cu—Mn spinels, according to an embodiment.

FIG. 2 is a graphical representation illustrating three-way catalyst (TWC) steady-state sweep test results comparing % NO conversions at specific % $O_2$ values associated with aged ZPGM Type 1 catalysts employing various doping loadings of Ni within a B-site substitution of Cu—Mn spinels, according to an embodiment. In FIG. 2, NO comparison graph 200 includes NO conversion curve 202 (solid bold line), NO conversion curve 204 (dot line), NO conversion curve 206 (dash line), conversion curve 208 (dot dash line), NO conversion curve 210 (dot dot dash line), and NO conversion curve 212 (solid line).

In some embodiments, NO conversion 202 illustrates % NO conversions associated with the aged ZPGM reference catalyst. In these embodiments, NO conversion 204 illustrates % NO conversions associated with the aged ZPGM Type 1A catalyst. Further to these embodiments, NO conversion curve 206 illustrates % NO conversions associated with the aged ZPGM Type 1B catalyst. Still further to these embodiments, NO conversion curve 208 illustrates % NO conversions associated with the aged ZPGM Type 1D catalyst. In these embodiments, NO conversion curve 210 illustrates % NO conversions associated with the aged ZPGM Type 1E catalyst. Further to these embodiments, NO conversion curve 212 illustrates % NO conversions associated with the aged ZPGM Type 1G catalyst.

In some embodiments, at the stoichiometric condition ($O_2$=0.49%) the catalytic performance of the aforementioned ZPGM Type 1 catalysts is enhanced by increasing the Ni dopant. In these embodiments and at the stoichiometric condition, the ZPGM reference catalyst ($Cu_1Mn_2O_4$) exhibits a NO conversion of about 0.06% while the ZPGM Type 1A catalyst exhibits a NO conversion of about 25.9%, the ZPGM Type 1B catalyst exhibits a NO conversion of about 37.5%, the ZPGM Type 1D catalyst exhibits a NO conversion of about 49.8%, the ZPGM Type 1E catalyst exhibits a NO conversion of about 63.57%, and the ZPGM Type 1G catalyst exhibits an improved NO conversion of about 68.06%. Further to these embodiments, the aforementioned ZPGM Type 1 catalysts exhibit higher NO oxidation activity when compared to the ZPGM reference catalyst.

In some embodiments, the test results indicate that for the ZPGM Type 1 catalysts, the factor that most influences the improvement in NO conversion is the molar ratio of the Ni dopant. In these embodiments, as the Ni molar ratio increases at stoichiometric and lean conditions, the ZPGM Type 1 catalysts NO conversion performance rapidly increases. Further to these embodiments and under rich conditions, the NO conversion remains substantially similar within the aforementioned ZPGM Type 1 catalysts and the ZPGM reference catalyst, exhibiting a NO conversion level of about 100%.

Figure 3:
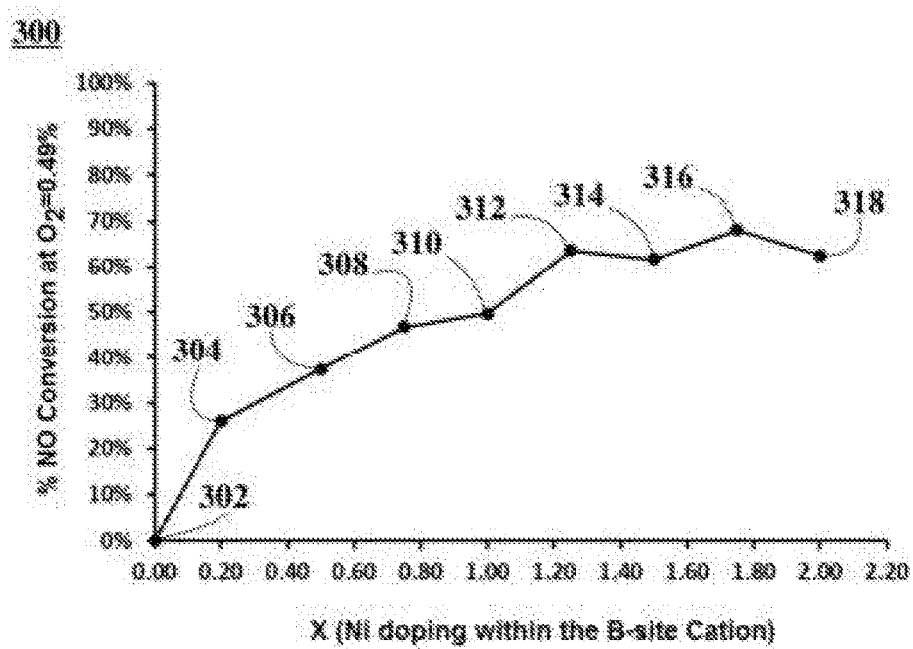
FIG. 3 is a graphical representation illustrating TWC steady-state sweep test results comparing % NO conversions at the stoichiometric condition ($O_2$=0.49%) associated with aged ZPGM Type 1 catalysts employing various loadings of Ni within a B-site substitution of Cu—Mn spinels, according to an embodiment.

FIG. 3 is a graphical representation illustrating TWC steady-state sweep test results comparing % NO conversions at the stoichiometric condition ($O_2$=0.49%) associated with aged ZPGM Type 1 catalysts employing various loadings of Ni within a B-site substitution of Cu—Mn spinels, according to an embodiment. In FIG. 3, NO comparison curve 300 includes NO conversion point 302, NO conversion point 304, NO conversion point 306, NO conversion point 308, NO conversion point 310, NO conversion point 312, NO conversion point 314, NO conversion point 316, and NO conversion point 318.

In some embodiments, NO conversion point 302 illustrates % NO conversion associated with the aged ZPGM reference catalyst. In these embodiments, NO conversion point 304 illustrates % NO conversion associated with the aged ZPGM Type 1A catalyst. Further to these embodiments, NO conversion point 306 illustrates % NO conversion associated with the aged ZPGM Type 1B catalyst. Still further to these embodiments, NO conversion point 308 illustrates % NO conversion associated with the aged ZPGM Type 1C catalyst. In these embodiments, NO conversion point 310 illustrates % NO conversion associated with the aged ZPGM Type 1D catalyst. Further to these embodiments, NO conversion point 312 illustrates % NO conversion associated with the aged ZPGM Type 1E catalyst. Still further to these embodiments, NO conversion point 314 illustrates % NO conversion associated with the aged ZPGM Type 1F catalyst. In these embodiments, NO conversion point 316 illustrates % NO conversion associated with the aged ZPGM Type 1G catalyst. Further to these embodiments, NO conversion point 318 illustrates % NO conversion associated with the aged ZPGM Type 1H catalyst.

In some embodiments, at the stoichiometric condition the ZPGM Type 1 catalysts exhibit greater NO conversion when compared to the ZPGM reference catalyst ($Cu_1Mn_2O_4$). In these embodiments and at the stoichiometric condition, catalytic performance of the ZPGM Type 1 catalysts is improved by increasing the Ni doping within the B-site cation of the Cu—Mn spinel. Further to these embodiments and referring to NO comparison curve 300, each improvement in NO conversion within the associated ZPGM Type 1 catalysts is due to the Ni loading within the associated Cu—Mn spinel composition.

Figure 4:
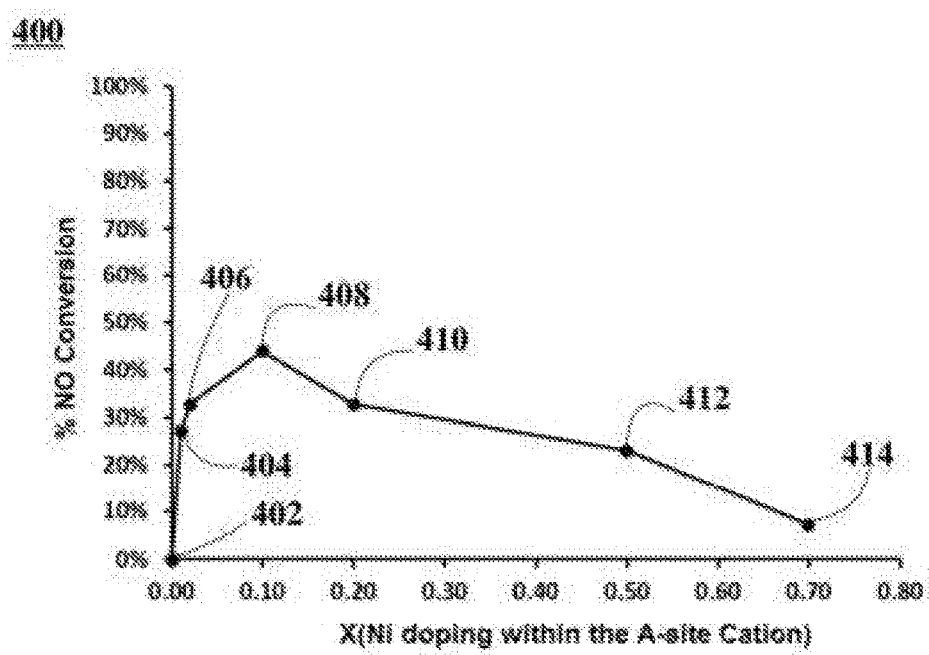
FIG. 4 is a graphical representation illustrating TWC steady-state sweep test results comparing % NO conversions at the stoichiometric condition ($O_2$=0.49%) associated with aged ZPGM Type 2 catalysts employing various loadings of Ni within an A-site substitution of Cu—Mn spinels, according to an embodiment.

FIG. 4 is a graphical representation illustrating TWC steady-state sweep test results comparing % NO conversions at the stoichiometric condition ($O_2$=0.49%) associated with aged ZPGM Type 2 catalysts employing various loadings of Ni within an A-site substitution of Cu—Mn spinels, according to an embodiment. In FIG. 4, NO comparison curve 400 includes NO conversion point 402, NO conversion point 404, NO conversion point 406, No conversion point 408, NO conversion point 410, NO conversion point 412, and NO conversion point 414.

In some embodiments, NO conversion point 402 illustrates % NO conversion associated with the aged ZPGM reference catalyst. In these embodiments, NO conversion point 404 illustrates % NO conversion associated with the aged ZPGM Type 2A catalyst. Further to these embodiments, NO conversion point 406 illustrates % NO conversion associated with the aged ZPGM Type 2B catalyst. Still further to these embodiments, NO conversion point 408 illustrates % NO conversion associated with the aged ZPGM Type 2C catalyst. In these embodiments, NO conversion point 410 illustrates % NO conversion associated with the aged ZPGM Type 2D catalyst. Further to these embodiments, NO conversion point 412 illustrates % NO conversion associated with the aged ZPGM Type 2E catalyst. Still further to these embodiments, NO conversion point 414 illustrates % NO conversion associated with the aged ZPGM Type 2F catalyst.

In some embodiments, at the stoichiometric condition the ZPGM Type 2 catalysts exhibit greater NO conversion when compared to the ZPGM reference catalyst. In these embodiments, the ZPGM reference catalyst exhibits a NO conversion of about 0.06%. Further to these embodiments and at the stoichiometric condition, catalytic performance of the ZPGM Type 2 catalysts is improved and exhibits a maximum NO conversion of about 43.9% for the ZPGM Type 2C catalyst. Still further to these embodiments and referring to NO comparison curve 400, each improvement in NO conversion within the associated ZPGM Type 2 catalysts is due to the Ni loading within the associated Cu—Mn spinel composition. In summary, a suitable Ni loading within the A-site cation of the Cu—Mn spinel enables the achievement of improved NO conversion levels.

Figure 5:
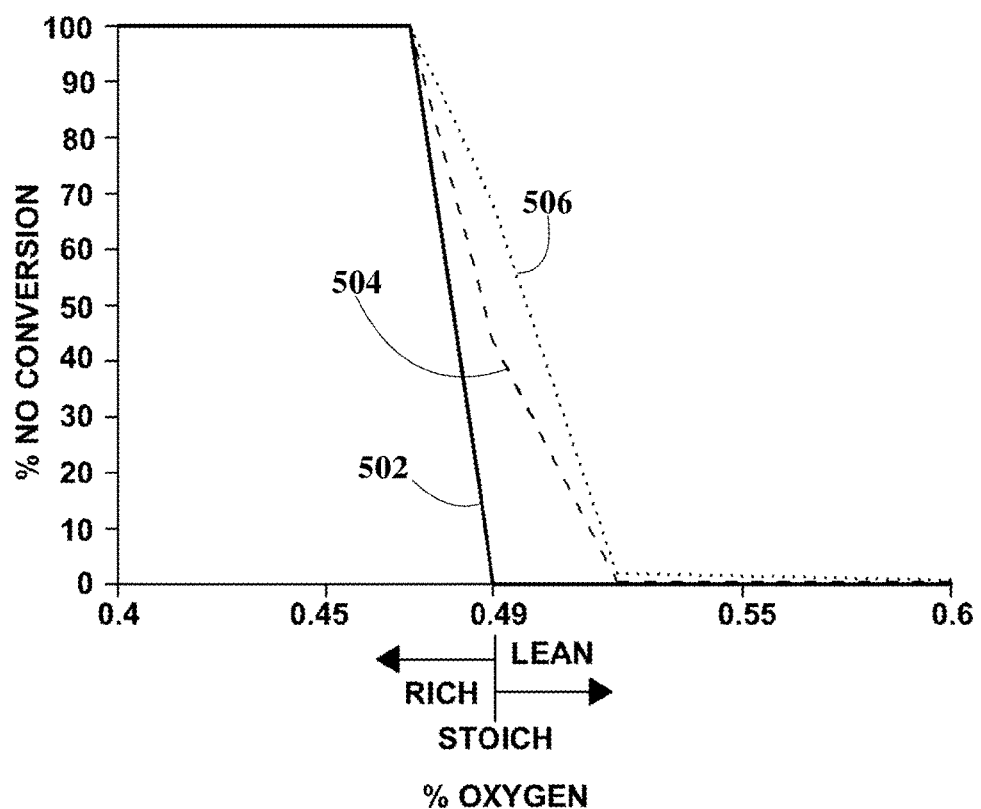
FIG. 5 is a graphical representation illustrating TWC steady-state sweep test results comparing % NO conversions at specific % $O_2$ values associated with aforementioned aged ZPGM catalysts as well as a ZPGM reference catalyst, according to an embodiment.

FIG. 5 is a graphical representation illustrating TWC steady-state sweep test results comparing % NO conversions at specific % $O_2$ values associated with aforementioned aged ZPGM catalysts as well as a ZPGM reference catalyst, according to an embodiment. In FIG. 5, NO comparison graph 500 includes NO conversion curve 502 (solid line), NO conversion curve 504 (dot line), and NO conversion curve 506 (dash line).

In some embodiments, NO conversion curve 502 illustrates % NO conversions associated with the aged ZPGM reference catalyst. In these embodiments, NO conversion curve 504 illustrates % NO conversions associated with the aged ZPGM Type 1G catalyst. Further to these embodiments, NO conversion curve 506 illustrates % NO conversions associated with the aged ZPGM Type 2C catalyst.

In some embodiments and at the stoichiometric condition, the ZPGM reference catalyst exhibits a NO conversion of about 0.06% while the ZPGM Type 1G catalyst exhibits a NO conversion of about 43.9% and the ZPGM Type 2C catalyst exhibits a NO conversion of about 68.1%. In these embodiments and referring to FIG. 5, test results confirm that improved NO conversions are achieved when Ni is partially substituted within B-site cation of the Cu—Mn spinel within the aforementioned ZPGM Type 1 catalysts. Further to these embodiments and referring to FIG. 5, test results confirm there are NO conversion improvements when Ni is partially substituted within the A-site cation of the Cu—Mn spinel within the aforementioned ZPGM Type 2 catalysts. Still further to these embodiments, the aforementioned A-site and B-site Ni-doped Cu—Mn spinel ZPGM catalysts (especially the ZPGM Type 1 catalyst) exhibit higher NO conversion performance at stoichiometric and lean conditions when compared to the ZPGM reference catalyst.

In summary, the factor that mostly influences the improvements in catalytic performance (e.g., NO conversion) within the aforementioned ZPGM catalysts is the molar ratio of the Ni dopant. Further, the site of the Ni dopant also affects the aforementioned catalytic performance. As Ni is doped within the B-site cation of the Cu—Mn spinel, the aforementioned ZPGM Type 1 catalysts exhibit improved catalyst activity when compared to the ZPGM reference catalyst. Additionally, the aforementioned ZPGM catalysts can provide improved ZPGM catalysts for TWC applications.

While various aspects and embodiments have been disclosed, other aspects and embodiments may be contemplated. The various aspects and embodiments disclosed here are for purposes of illustration and are not intended to be limiting, with the true scope and spirit being indicated by the following claims.

The invention claimed is:

1. A catalyst comprising:
   a substrate;
   a washcoat layer overlying the substrate, the washcoat layer comprising a support oxide; and
   an impregnation layer overlying the washcoat layer, the impregnation layer comprising a doped binary spinel having the formula $CuMn_{2-x}Ni_xO_4$ wherein x is a number from 0.01 to 1.99.

2. The catalyst of claim 1, wherein x is a number ranging from 0.2 to 1.8, from 0.2 to 1.5, from 0.2 to 1.25, from 0.2 to 1.0, from 0.2 to 0.75, from 0.2 to 0.5, from 0.5 to 1.8, from 0.5 to 1.5, ranging from 0.5 to 1.25, from 0.5 to 1.0, from 0.5 to 0.75, from 0.75 to 1.8, from 0.75 to 1.5, from 0.75 to 1.25, from 0.75 to 1.0, from 1.0 to 1.8, from 1.0 to 1.5, or from 1.0 to 1.25.

3. The catalyst of claim 1, wherein the support oxide is selected from the group consisting of $Al_2O_3$, doped $Al_2O_3$, $ZrO_2$, doped $ZrO_2$, $SiO_2$, doped $SiO_2$, $TiO_2$, doped $TiO_2$, $Al_2O_3$—$ZrO_2$, doped $Al_2O_3$—$ZrO_2$, $Nb_2O_5$, doped $Nb_2O_5$, and mixtures thereof, and wherein the dopant in the support oxide, when present, is selected from the group consisting of calcium, strontium, barium, yttrium, lanthanum, cerium, neodymium, praseodymium, niobium, silicon, tantalum, and combinations thereof.

4. The catalyst of claim 1, wherein the washcoat layer comprises Nb-doped $Al_2O_3$—$ZrO_2$.

5. A catalyst comprising
   a substrate;
   a washcoat layer overlying the substrate, the washcoat layer comprising a support oxide; and
   an impregnation layer overlying the washcoat layer, the impregnation layer comprising a doped binary spinel having the formula $Cu_{1-x}Ni_xMn_2O_4$ wherein x is a number from 0.01 to 0.99.

6. The catalyst of claim 5, wherein x is a number ranging from 0.01 to 0.70, from 0.01 to 0.5, from 0.01 to 0.2, from 0.01 to 0.1, from 0.1 to 0.7, from 0.1 to 0.5, from 0.1 to 0.2, from 0.2 to 0.7, or from 0.2 to 0.5.

7. The catalyst of claim 5, wherein the doped binary spinel further comprises an additional dopant selected from the group consisting of titanium, aluminum, magnesium, cobalt, barium, lanthanum, cadmium, tin, yttrium, zirconium, silver, iron, chromium, niobium, cerium, scandium, molybdenum, tungsten, and combinations thereof.

8. The catalyst of claim 5, wherein the support oxide is selected from the group consisting of $Al_2O_3$, doped $Al_2O_3$, $ZrO_2$, doped $ZrO_2$, $SiO_2$, doped $SiO_2$, $TiO_2$, doped $TiO_2$, $Al_2O_3$—$ZrO_2$, doped $Al_2O_3$—$ZrO_2$, $Nb_2O_5$, doped $Nb_2O_5$, and mixtures thereof, and wherein the dopant in the support oxide, when present, is selected from the group consisting of calcium, strontium, barium, yttrium, lanthanum, cerium, neodymium, praseodymium, niobium, silicon, tantalum, and combinations thereof.

9. The catalyst of claim 5, wherein the washcoat layer comprises Nb-doped $Al_2O_3$—$ZrO_2$.

10. The catalyst of claim 5, wherein the impregnation layer is deposited overlying the washcoat layer as a solution, and has been calcined at a temperature from about 600° C. to about 700° C.

11. The catalyst of claim 5, wherein the catalyst exhibits an NO percent conversion that is from about 25 to about 70%.

* * * * *